United States Patent
Jacobson

(10) Patent No.: US 9,806,513 B2
(45) Date of Patent: Oct. 31, 2017

(54) ROBUST SOLID-STATE CIRCUIT PROTECTION APPARATUS

(71) Applicant: Raytheon Company, Waltham, MA (US)

(72) Inventor: Boris S. Jacobson, Westford, MA (US)

(73) Assignee: RAYTHEON COMPANY, Waltham, MA (US)

( * ) Notice: Subject to any disclaimer, the term of this patent is extended or adjusted under 35 U.S.C. 154(b) by 308 days.

(21) Appl. No.: 14/632,356

(22) Filed: Feb. 26, 2015

(65) Prior Publication Data

US 2016/0254658 A1 Sep. 1, 2016

(51) Int. Cl.
| | |
|---|---|
| *H02H 3/00* | (2006.01) |
| *H02H 9/00* | (2006.01) |
| *H02H 3/08* | (2006.01) |
| *H02H 7/00* | (2006.01) |
| *H02H 9/02* | (2006.01) |
| *H02H 3/02* | (2006.01) |

(52) U.S. Cl.
CPC ............... *H02H 3/00* (2013.01); *H02H 3/08* (2013.01); *H02H 7/008* (2013.01); *H02H 9/00* (2013.01); *H02H 9/028* (2013.01); *H02H 3/021* (2013.01); *H02H 3/025* (2013.01)

(58) Field of Classification Search
CPC .......... H02H 3/00; H02H 3/021; H02H 3/025; H02H 3/08; H02H 7/008; H02H 9/00; H02H 9/028
USPC ........................................................ 361/91.5
See application file for complete search history.

(56) References Cited

U.S. PATENT DOCUMENTS

| | | | |
|---|---|---|---|
| 3,303,388 A | 2/1967 | Means | |
| 3,534,226 A | 10/1970 | Lian | |
| 3,543,091 A | 11/1970 | Marek | |
| 3,564,336 A | 2/1971 | Buergi et al. | |
| 3,654,518 A | 4/1972 | Phelps et al. | |
| 3,668,483 A | 6/1972 | Kellenbenz | |
| 3,723,816 A * | 3/1973 | Pollard ................ | H02H 7/1216 327/448 |
| 3,792,289 A | 2/1974 | Kazem | |
| 3,851,218 A | 11/1974 | York | |
| 4,203,040 A * | 5/1980 | Abbondanti ......... | H03K 17/136 307/65 |
| 4,245,184 A | 1/1981 | Billings et al. | |
| 4,245,185 A | 1/1981 | Mitchell et al. | |
| 4,490,769 A | 12/1984 | Boenig | |

(Continued)

*Primary Examiner* — Thienvu Tran
*Assistant Examiner* — Kevin J Comber
(74) *Attorney, Agent, or Firm* — Cantor Colburn LLP

(57) ABSTRACT

A solid-state zero current switching circuit breaker is configured to interrupt current flow between a voltage input and a load. The solid-state zero current switching circuit breaker includes at least one resonant capacitor cell having an input configured to receive a source voltage and an output configured to deliver drive current to the load. The resonant capacitor cell is configured to selectively limit the drive current to the output based on a variable voltage. The solid-state zero current switching circuit breaker further includes at least one voltage clamping switch configured to detect a short-circuit fault or an overload condition. The voltage clamping switch adjusts the variable voltage in response to detecting the short-circuit fault condition or the overload condition such that the resonant capacitor cell limits the drive current.

20 Claims, 14 Drawing Sheets

(56) References Cited

U.S. PATENT DOCUMENTS

| | | |
|---|---|---|
| 5,561,579 A | 10/1996 | Gyugyi et al. |
| 5,581,433 A | 12/1996 | Jordan |
| 5,606,482 A | 2/1997 | Witmer |
| 5,726,848 A | 3/1998 | Boenig |
| 6,104,106 A | 8/2000 | Partridge |
| 6,515,840 B2 | 2/2003 | Covi et al. |
| 7,839,201 B2 | 11/2010 | Jacobson |
| 8,076,967 B2 | 12/2011 | Jacobson |
| 2003/0132736 A1 | 7/2003 | O'Mara et al. |
| 2013/0234526 A1 | 9/2013 | Jacobson et al. |

\* cited by examiner

ROBUST SOLID-STATE CIRCUIT PROTECTION APPARATUS

BACKGROUND

The present disclosure relates generally to solid-state circuits, and more particularly, to a solid-state circuit protection apparatus.

Many known electrical power and distribution systems include circuit breakers configured to completely interrupt current flowing between two points of the system in response to a circuit fault condition such as, for example, a short-circuit condition. Moreover, electromechanical circuit breakers typically take milliseconds to respond to short-circuit fault conditions. Emerging solid-state circuit breakers, therefore, often utilize semiconductor devices such as insulated-gate bipolar transistors (IGBTs), for example, to completely interrupt the current flowing through the circuit.

Conventional solid state circuit breakers based on transistors typically have low surge current capabilities and cannot sustain internal failures. Moreover, the instantaneous change in current level in response to instantaneously interrupting current flow can cause voltage surges that can degrade and/or damage the semiconductor switches leading to stress-induced switch failures. Transient voltage suppressing components are typically implemented in conventional solid-state circuit breakers to protect the transistors from voltage surges. These transient voltage suppressing components, however, increase the cost and complexity of the overall circuit breaker. The transient voltage suppressing components are also susceptible to stress-induced degradation, thereby resulting in unreliable protection of the semiconductor devices over time.

SUMMARY

According to a non-limiting embodiment, a solid-state zero current switching circuit breaker is configured to interrupt current flow between a voltage input and a load. The solid-state zero current switching circuit breaker includes at least one resonant capacitor cell having an input configured to receive a source voltage and an output configured to deliver drive current to the load. The resonant capacitor cell is configured to selectively limit the drive current to the output based on a variable voltage. The solid-state zero current switching circuit breaker further includes at least one voltage clamping switch configured to detect a short-circuit fault and/or an overload condition. The voltage clamping switch adjusts the variable voltage in response to detecting the short-circuit fault condition or the overload condition such that the resonant capacitor cell limits the drive current.

According to another non-limiting embodiment, a solid-state circuit protection system comprises a first resonant capacitor cell, a second resonant capacitor cell, and an electronic circuit breaker control module. The first resonant capacitor cell has a positive-side input connected to a positive voltage source and a positive-side output connected to a positive-side output terminal. The first resonant capacitor cell includes a plurality of positive-side semiconductor devices configured to deliver a first drive current to the positive-side output, and at least one positive-side controllable inductor configured to selectively limit a level of the first drive current flowing through at least one of the positive-side semiconductor devices. The second resonant capacitor cell has an negative-side input connected to a negative voltage source and a negative-side output connected to a negative-side output terminal. The second resonant capacitor cell includes a plurality of negative-side semiconductor devices configured to deliver a second drive current to the negative-side output, and at least one negative-side controllable inductor configured to selectively limit a level of the second drive current flowing through at least one of the negative-side semiconductor devices. The electronic circuit breaker control module is in signal communication with the positive-side resonant capacitor cell and the negative-side resonant capacitor cell. The circuit breaker control module is configured to monitor a current level of at least one of the first and second drive currents. The circuit breaker control module is further configured to initiate at least one of the positive-side and negative-side controllable inductors from the passive mode into the full inductance mode in response to a current level of the first and second drive current, respectively, exceeding a current level threshold.

According to yet another non-limiting embodiment, a method of interrupting current flow between a voltage input and a load comprises delivering a source voltage to an input of at least one resonant capacitor cell and delivering drive current from the source voltage to a load connected to an output of the at least on resonant capacitor cell. The method further includes detecting a short-circuit fault condition and/or an overload condition between the source voltage and the load, and adjusting a variable voltage applied to the resonant capacitor cell in response to detecting the short-circuit fault condition or the overload condition. The method further includes limiting the drive current flowing through the at least one resonant capacitor cell in response to adjusting the variable voltage.

Additional features are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

According to various non-limiting embodiments of the invention, a solid-state zero current switching (ZCS) circuit breaker is provided that includes semiconductor switches to interrupt fault current flow, and a series resonant capacitor circuit cell that introduces zero-crossing points into the fault current. In this manner, the series resonant capacitor circuit cell delivers power in short, defined segments which eliminate the voltage transient surges applied to the semiconductor switches. Accordingly, transient voltage stress applied to the semiconductor switches is reduced while allowing only limited current flow through the circuit breaker such that damage from current overload conditions can be prevented. The ZCS circuit breaker achieves fast response fault clearing times in the range of approximately 10 microseconds (μs) to 50 μs is since the ZCS circuit breaker includes semiconductor switches. Further, the solid-state ZCS circuit breaker according to various embodiments of the invention intrinsically limits the peak fault current value during the time at which the circuit breaker is effectively switched off thereby preventing forced arc faults and transients stresses applied to the semiconductor switches.

According to another embodiment, the series resonant capacitor circuit cell includes a controllable inductor configured to operate in a passive mode (e.g., 10 percent of the available inductance) when the ZCS circuit breaker operates under normal operating conditions, and a full inductance mode (100 percent of available inductance) when the ZCS circuit breaker experiences an internal fault condition such as, for example, a short-circuit fault condition of one semiconductor switch of the circuit breaker. In this manner, an internal circuit breaker fault propagation is contained when a semiconductor switch failure occurs.

Figure 1:
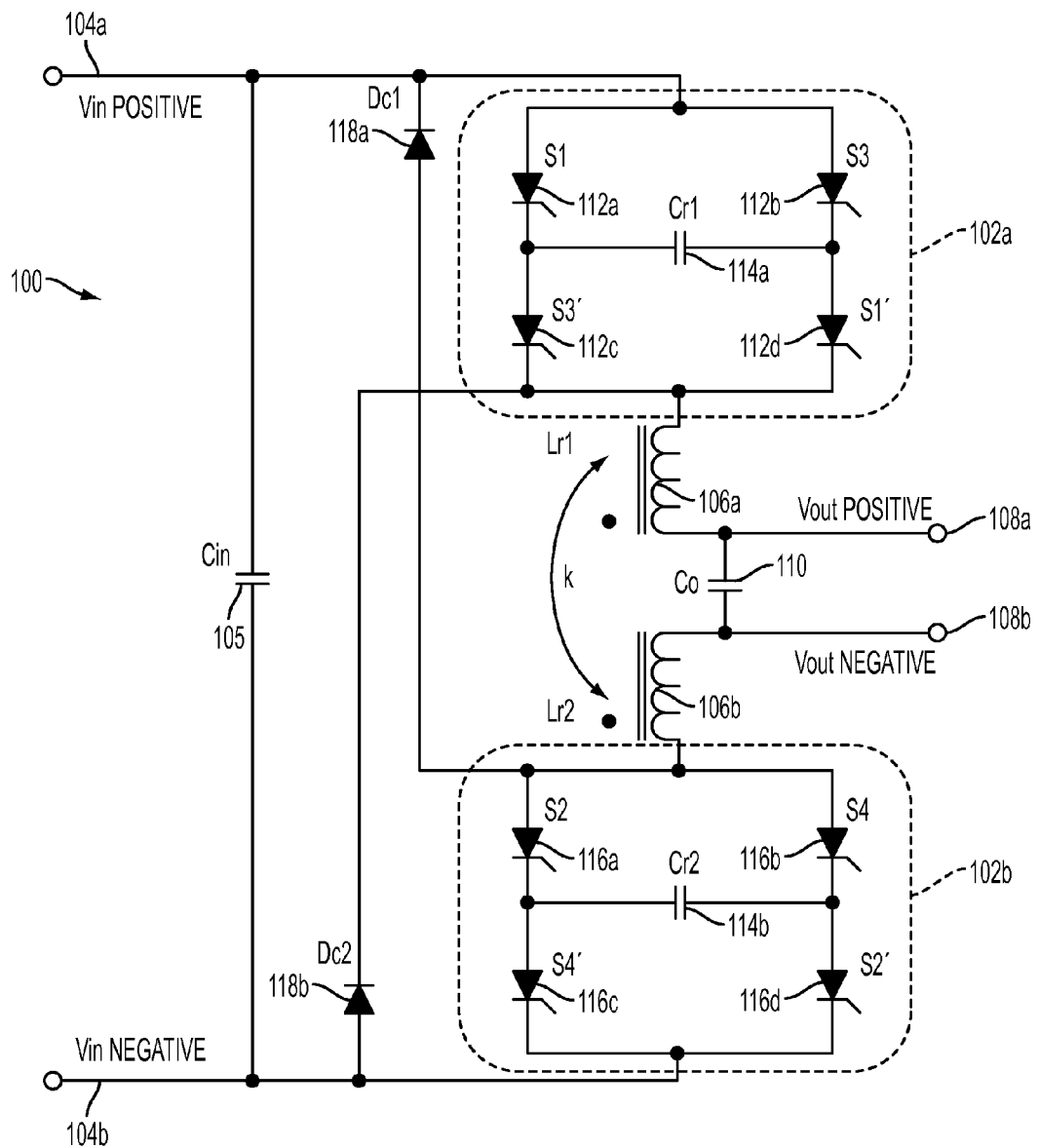
FIG. 1 illustrates an electrical schematic of a solid-state circuit breaker according to a non-limiting embodiment.

Turning now to FIG. 1, a solid-state ZCS circuit breaker 100 is illustrated according to a non-limiting embodiment. The ZCS circuit breaker 100 includes a first series resonant capacitor cell 102a and a second series resonant capacitor cell 102b. The first and second resonant cells 102a-102b are configured to selectively limit the drive current delivered to the output based on a variable voltage (i.e., a variable control voltage that can limit the drive current). Each of the first series resonant capacitor cell 102a includes an input connected to a first voltage rail 104a (e.g., a positive voltage rail 104a), and the second series resonant capacitor cell 102b includes an input connected to a second voltage rail 104b (e.g., a negative voltage rail 104b). Although two input rails 104a-104b and two series resonant capacitor cells 102a-102a cells are illustrated in the figures, it should be appreciated that the solid-state ZCS circuit breaker 100 can comprise a single input rail 104 and a respective single series resonant capacitor cell 102. Each input rail 104a-104b is configured to handle a voltage of, for example, approximately 3000 volts (V). According to a non-limiting embodiment, a filter element 105 such as a capacitor, for example, may be connected between the first input rail 104a and the second input rail 104b to reduce undesired noise that may exist on the first and second input rails 104a-104b.

A first resonant inductor 106a has a first terminal connected to the output of the first resonant capacitor cell 102a and a second terminal connected to a first output terminal 108a (e.g., positive output terminal 108a) of the ZCS circuit breaker 100. The combination of the first resonant capacitor cell 104a and the first resonance inductor 106a forms a first resonance tank circuit as understood by one of ordinary skill in the art. Similarly, a second resonant inductor 106b has a first terminal connected to the output of the second resonant capacitor cell 102b and a second terminal connected to a second output terminal 108b (e.g., negative output terminal 108b) of the ZCS circuit breaker 100. The combination of the second resonant capacitor cell 104b and the second resonance inductor 106b forms a second resonance tank circuit. The first resonance inductor 106a and the second resonance inductor 106b are magnetically coupled with respect to one another according to an inductance coupling value (k). The value of the coupling factor k between the first and second inductors 106a-106b can be varied to achieve desired electromechanical and thermal characteristics as understood by one of ordinary skill in the art. An output smoothing capacitor 110 can be connected between the first output terminal 108a and the second output terminal 108b to reduce undesired residual periodic variations (i.e., smooth the current ripple) in the output current flowing through the first and second output terminals 108a-108b.

The first resonant capacitor cell 102a and the second resonant capacitor cell 102b each comprise a first plurality of current-directional controlled semiconductor switching devices 112. The current-directional controlled semiconductor switching devices 112 include, but are not limited to, thyristors that are configured to selectively interrupt current flow through the ZCS circuit breaker 100. According to a non-limiting embodiment, the first resonant capacitor cell 102a comprises four positive-side thyristors 112a-112d and a first resonance capacitor 114a arranged as a bridge rectifier circuit. Each thyristor 112a-112d includes an anode, a cathode, and a gate terminal. The gate terminal is configured to receive a gate signal generated by a microcontroller, for example. When the gate signal is applied to the gate terminal of a respective thyristor 112a-112d, the thyristor 112a-112d allows un-inhibited current flow from the anode to the cathode. Therefore, selectively applying the gate signal to one or more thyristors 112a-112d can selectively inhibit current flow through the first resonant capacitor cell 102a. For example, the gate signals to each of the thyristors 112a-112d can be terminated in response to detecting a short-circuit condition and/or an overload condition. In response to terminating the gate signals, the current through the thyristors 112a-112d are inhibited such that the drive current through the first resonant capacitor cell 102a is inhibited, thereby effectively switching off the first resonant capacitor cell 102a.

A first positive-side thyristor 112a has an anode connected to the first input terminal 104a and a cathode connected to a first terminal of the first resonance capacitor 114a. A positive-side second thyristor 112b has an anode connected to the first input terminal 104a (e.g., the positive input terminal 104a) and a cathode connected to an opposite terminal of the first resonance capacitor 114a. A third positive-side thyristor 112c has an anode connected to the first terminal of the first resonance capacitor 114a and a cathode connected to the first terminal of the first resonance inductor 106a. A fourth positive-side thyristor 112d has an anode connected to the second terminal of the first resonance capacitor 114a and a cathode connected to the first terminal of the first resonance inductor 106a. The first resonance capacitor 114a can have capacitance ranging, for example, from approximately 14 microfarads (μF) to approximately 15 μF. The first resonance capacitor 114a can have a capacitance ranging, for example, from approximately 14 microfarads (μF) to approximately 15 μF. The first resonance inductor 106a can have an inductance ranging, for example, from approximately 2 microhenries (μH) to approximately 3 μH.

In a similar fashion, the second resonant capacitor cell 102b comprises four negative-side thyristors 116a-116d and a second resonance capacitor 114b arranged as a bridge rectifier circuit. Each thyristor 116a-116d includes an anode, a cathode and a gate terminal. The thyristors 116a-116d can be controlled in response to receiving a gate signal in a similar manner as the thyristors 112a-112d described in detail above. In this manner, the thyristors 116a-116b can selectively inhibit current flow through the second resonant capacitor cell 102b, thereby effectively switching off the second resonant capacitor cell 102b.

A first negative-side thyristor 116a has an anode connected to the first terminal of the second resonance inductor 106b and a cathode connected to a first terminal of the second resonance capacitor 114b. A second negative-side thyristor 116b has an anode connected to the first terminal of the second resonance inductor 106b and a cathode connected to a second terminal of the second resonance capacitor 114b. A third negative-side thyristor 116c has an anode connected to the first terminal of the second resonance capacitor 114b and a cathode connected to the second input terminal 104b (e.g., the negative input terminal 104b). A fourth negative-side thyristor 116d has an anode connected to the second terminal of the second resonance capacitor 114b and a cathode connected to the second input terminal 104b. The second resonance capacitor 114b can have a capacitance ranging, for example, from approximately 14 microfarads (μF) to approximately 15 μF. The second resonance inductor 106b can have an inductance ranging, for example, from approximately 2 pH to approximately 3 μH.

The ZCS circuit breaker 100 further includes a first voltage clamping switch 118a and a second voltage clamping switch 118b. The first and second voltage clamping switches 118a-118b are configured to detect a short-circuit fault or an overload condition. That is, the first and second voltage clamping switches 118a-118b each are switched on (i.e., are forward biased) in response to a short-circuit condition or an overload condition. In response to the short-circuit condition or overload condition, the first and second clamping diodes 118a-118b vary the voltage realized by the first and second resonant cells 102a-102b, respectively such that the respective resonant capacitor cell limits the drive current delivered to the output terminals and the load. It should be appreciated that only a single voltage clamping switch 118 can be used in the case where the ZCS circuit breaker 100 includes only a single input rail 104 and a single respective series resonant capacitor cell 102. According to an embodiment, the first voltage clamping switch 118a and the second voltage clamping switch 118b each comprise, for example, a first clamping diode 118a and a second clamping diode 118b, respectively. The first clamping diode 118a has a cathode connected to the first input terminal 104a (e.g., the positive input terminal 104a) and an anode that is connected to the anode of the first negative-side thyristor 116a, the anode of the second negative-side thyristor 116b, and the first terminal of the second resonance inductor 106b. The second clamping diode 118b has an anode that is connected to the second input terminal 104b (e.g., the negative input terminal 104b), and a cathode that is connected to the cathode of the third positive-side thyristor 112c, the cathode of the fourth positive-side thyristor 112d, and the first input of the first resonance inductor 106a. When the first and second clamping diodes 118a-118b are forward biased (i.e., conduct current) during a fault condition such as short-circuit condition, for example, the current flowing through the first and second resonant capacitor cells 102a-102b is limited as discussed in greater detail below.

Figure 2:
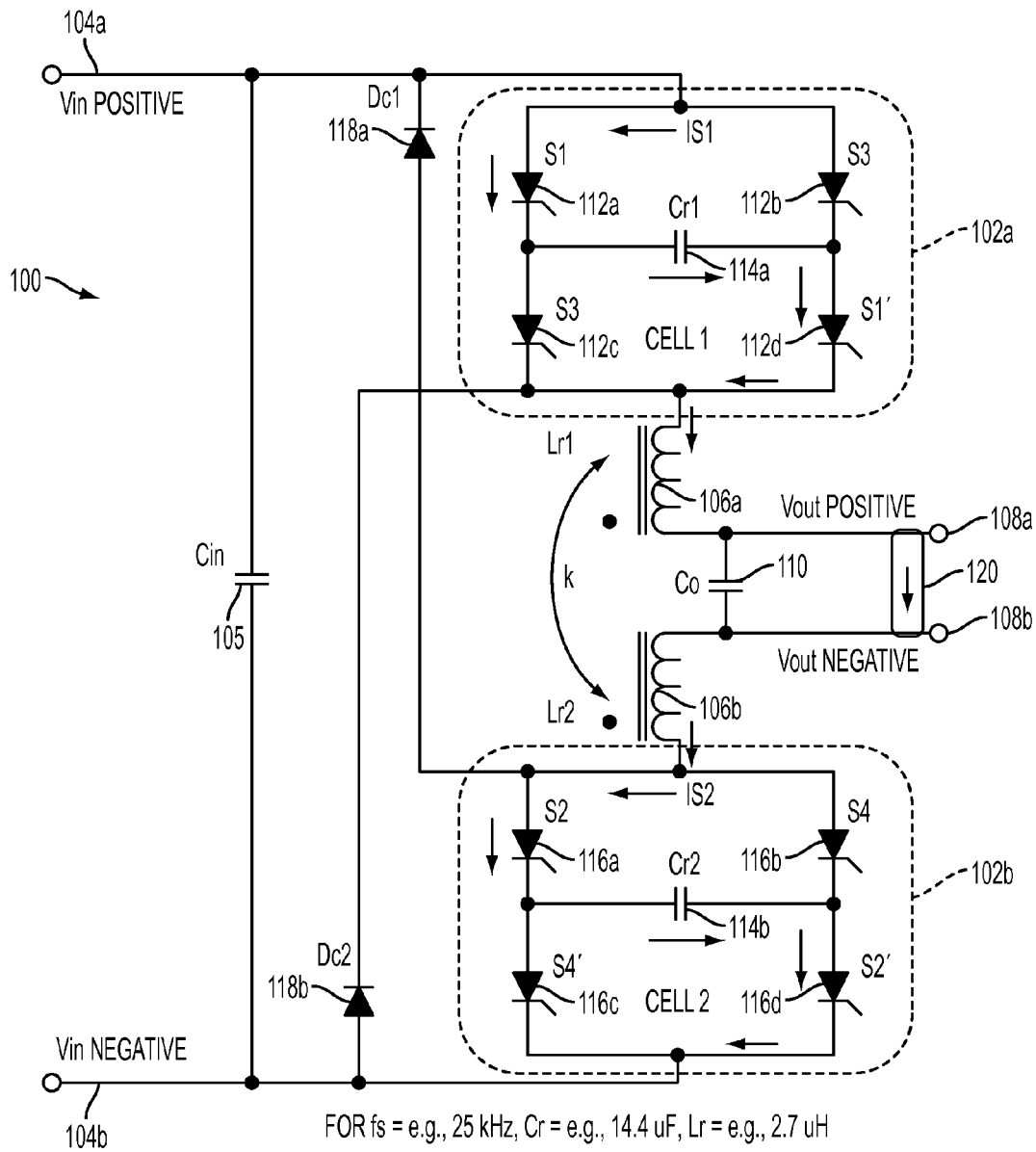
FIG. 2 is an electrical schematic illustrating current flow through the solid-state circuit breaker during normal operating conditions.
Figure 3A:
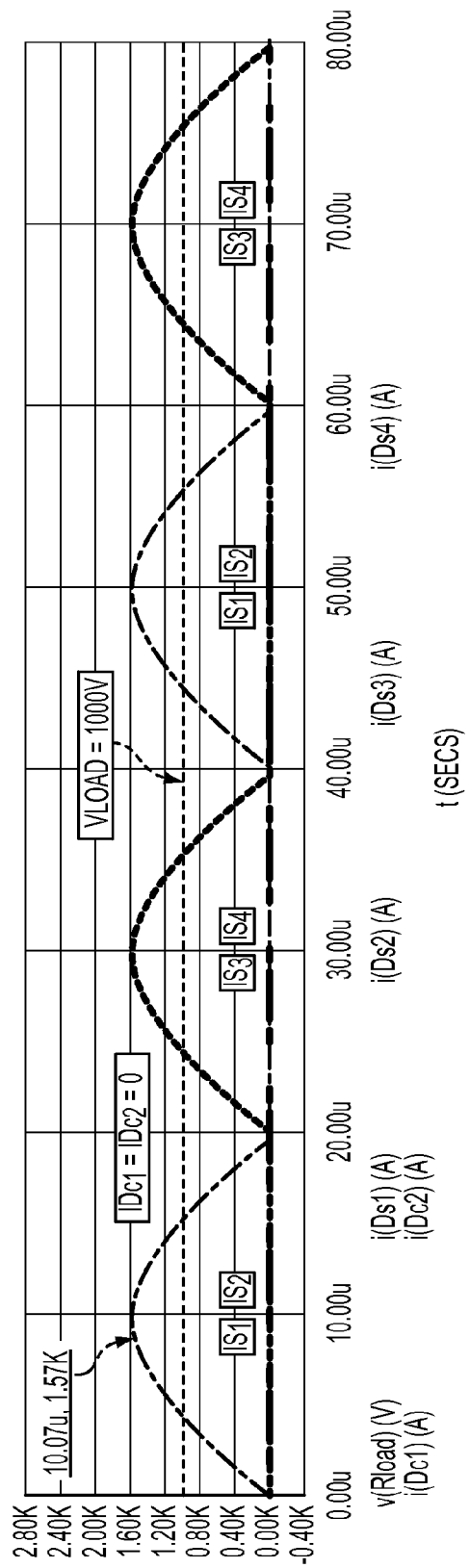
FIGS. 3A-3D are diagrams illustrating the electrical parameters of the solid-state circuit breaker during normal operating conditions.
Figure 3B:
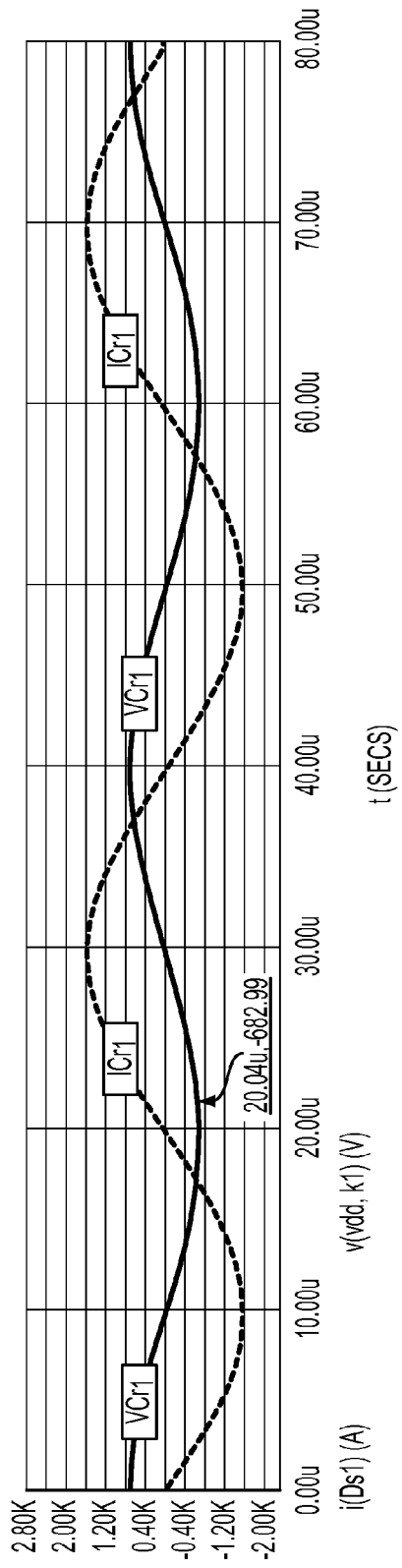
Figure 3C:
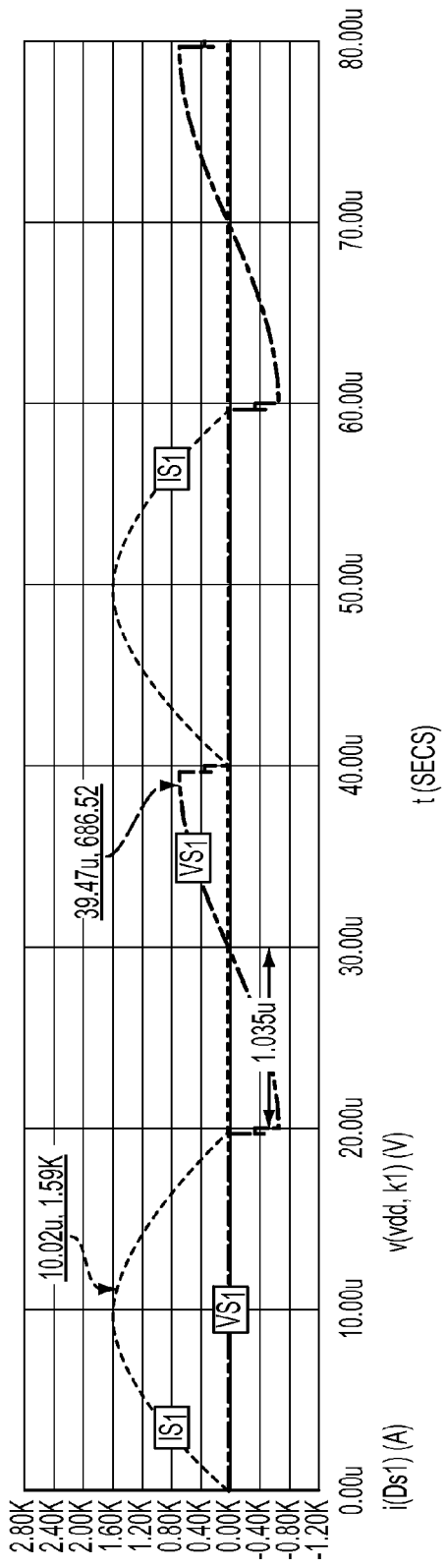
Figure 3D:
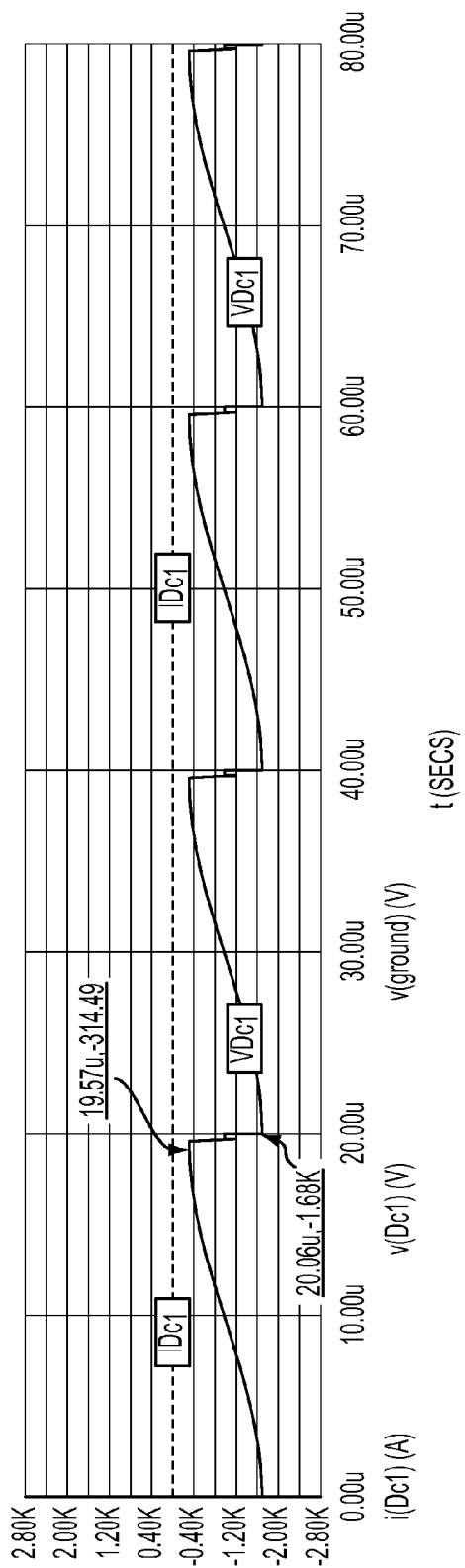

Turning now to FIG. 2, the ZCS circuit breaker 100 is shown operating during normal conditions, i.e., without a short-circuit fault or overload condition, to drive a load 20 connected in series between the first and second resonant capacitor cells 102a-102b. When operating under normal operating conditions, current flows from the first input rail 104a (i.e., the positive input rail 104a), through the first series resonant capacitor cell 102a and first resonance inductor 106a, through the load 120, and through the second input rail 104b and second series resonant capacitor cell 102b, before arriving at the second input rail 104b (i.e., the negative input rail). When there is no short-circuit or current overload, the first and second resonant capacitors 114a-114b are never charged to the full input voltage. As a result, the first and second clamping diodes 118a-118b are not forward biased (i.e., are not switched on) and therefore do not conduct current (e.g., IDc1) therethrough (see FIG. 3D). Accordingly, the voltage difference between the anode and cathode of the thyristors (e.g., 112a/116a) is positive with respect to the anode and current (Is1/Is2) flows without interruption through the thyristors (e.g., 112a/116a) during one half-cycle of the sinewave, e.g., the first positive-side thyristor 112a and the first negative side thyristor 116a (see FIG. 3A) such that the load is continuously driven using a maximum desired current (see FIG. 3B). Moreover, the positive-side thyristors 112a-112d and negative-side thyristors 116a-116d have a long recovery time reaching approximately 20 μs, for example (see FIG. 3C). Accordingly, a current overload can be interrupted during the recovery time of the thyristors 112a-112d/116a-116d as discussed in greater detail below.

Figure 4A:
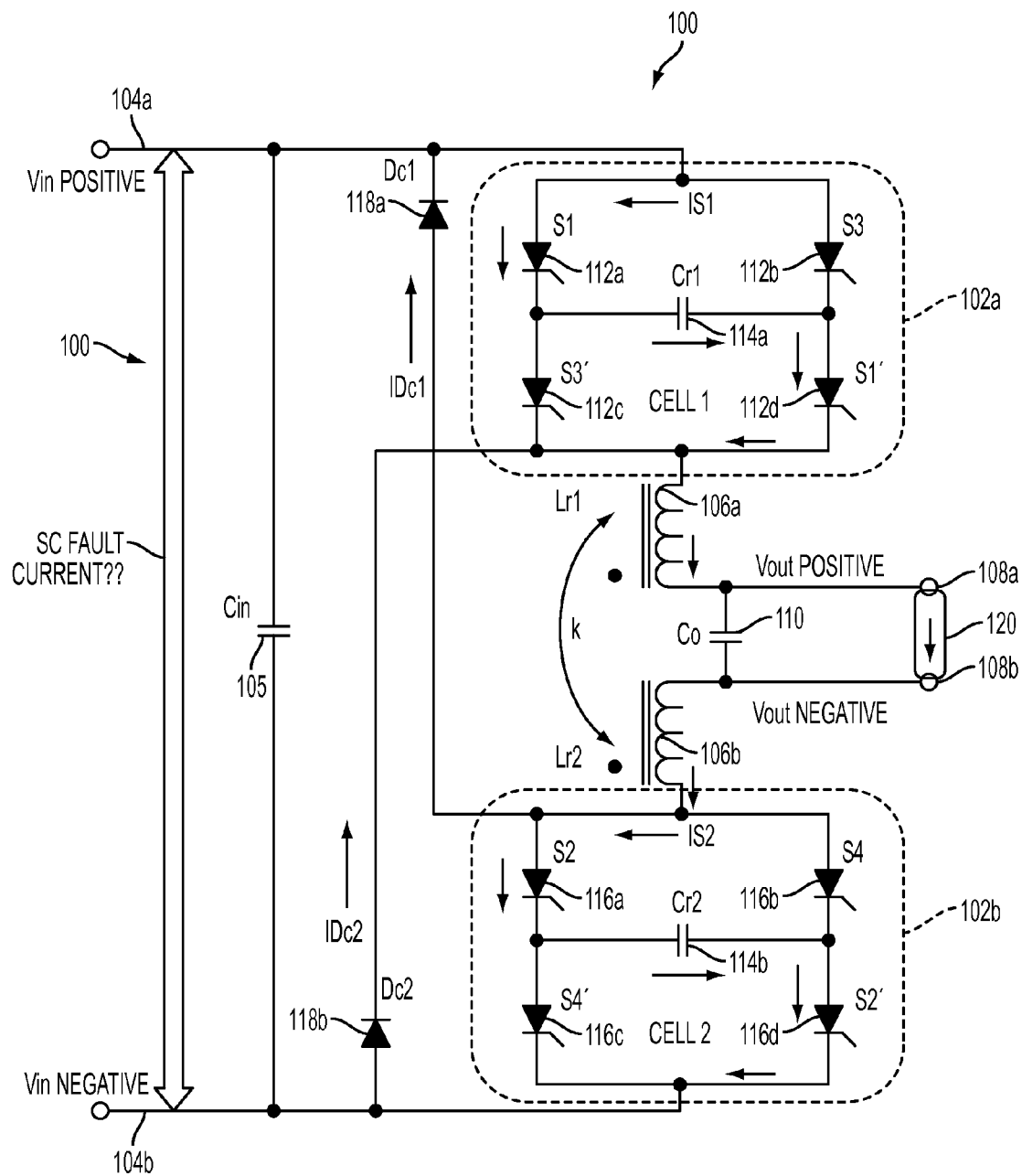
FIGS. 4A-4B are electrical schematics illustrating current flow through the solid-state circuit breaker during a short-circuit condition.
Figure 4B:
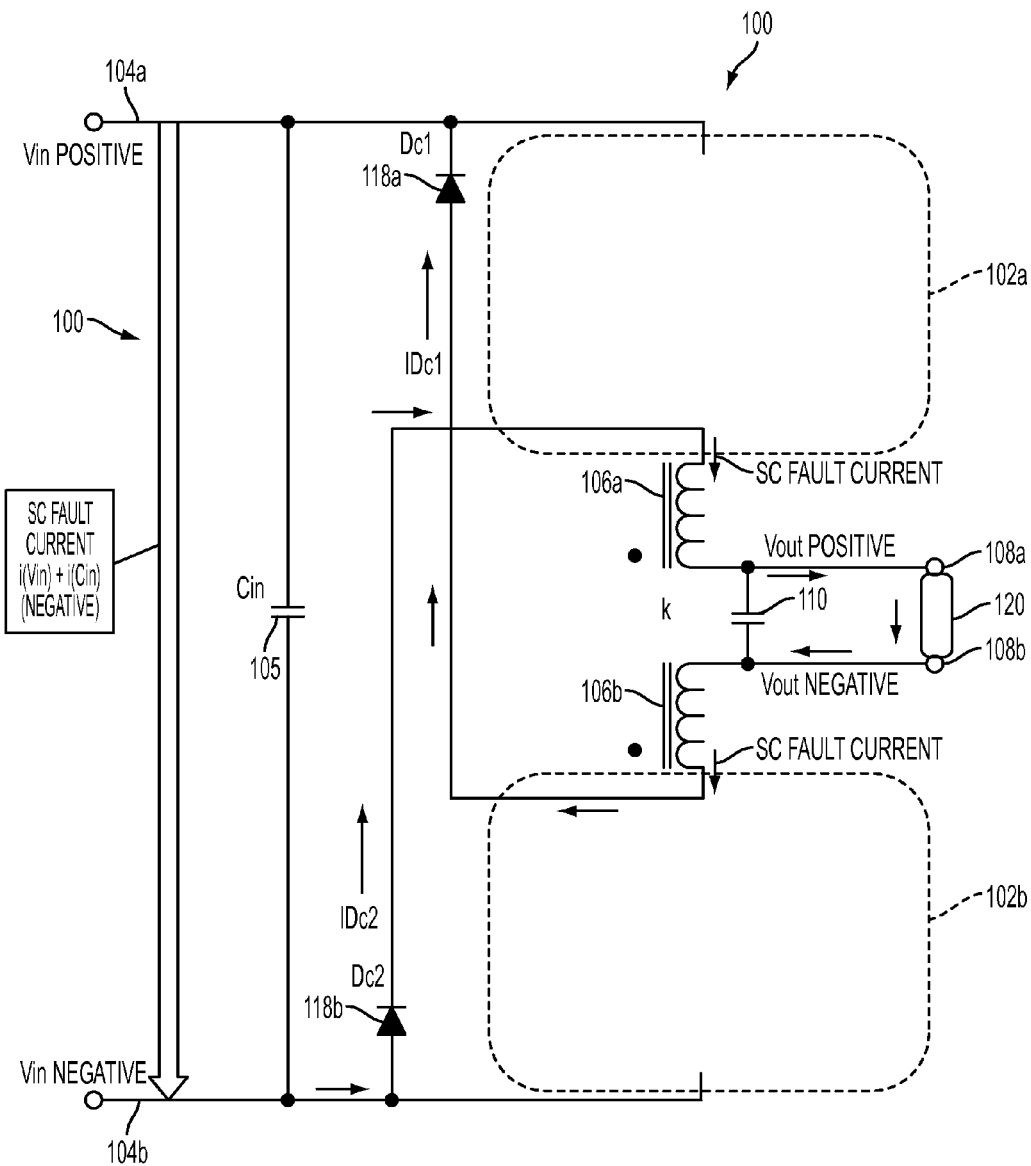

Turning to FIGS. 4A-4B, the ZCS circuit breaker 100 is shown operating after a circuit fault occurs. More specifically, in the event of an overload condition or short circuit fault condition, the first and second resonant capacitor cells 102a-102b appear as virtual open circuits during a portion of the load current cycle (see FIG. 4B). Accordingly, the short-circuit fault current (indicated by arrows in FIGS. 4A-4B) follows a short-circuit current path flowing from a first input rail (e.g., the positive input rail 104), to a second voltage input rail (e.g., the negative input rail 104b), through the first and second clamping diodes 118a-118b, and back to the first input rail 104a (see FIG. 4B).

Figure 5A:
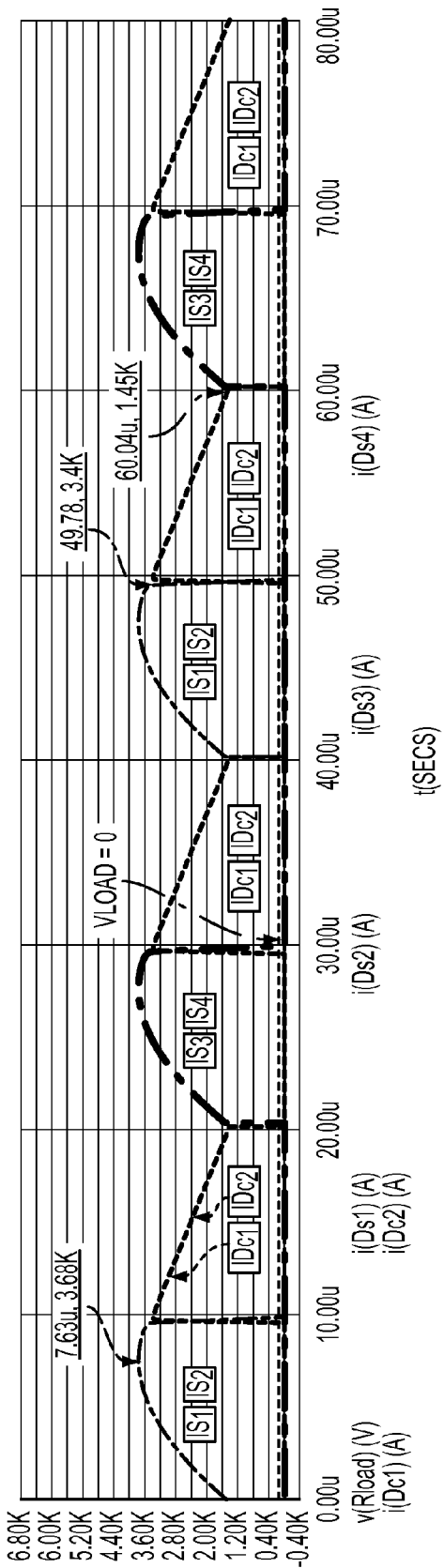
FIGS. 5A-5D are diagrams illustrating the electrical parameters of the solid-state circuit breaker during the short-circuit condition.
Figure 5B:
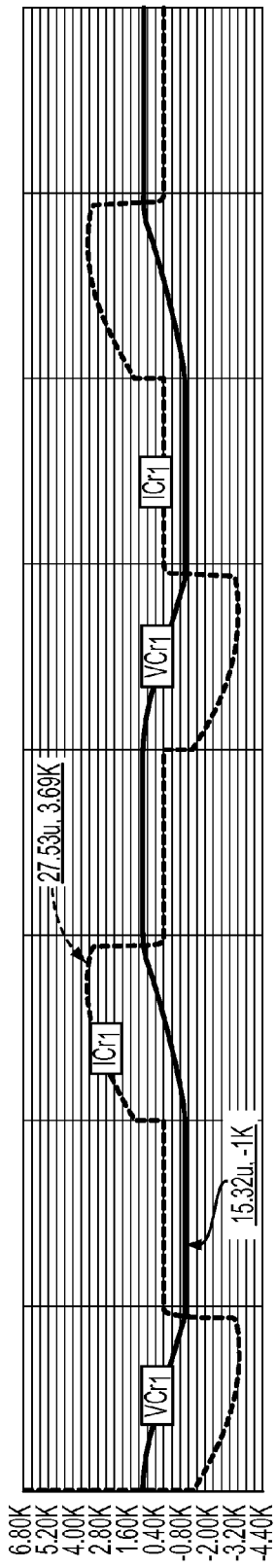
Figure 5C:
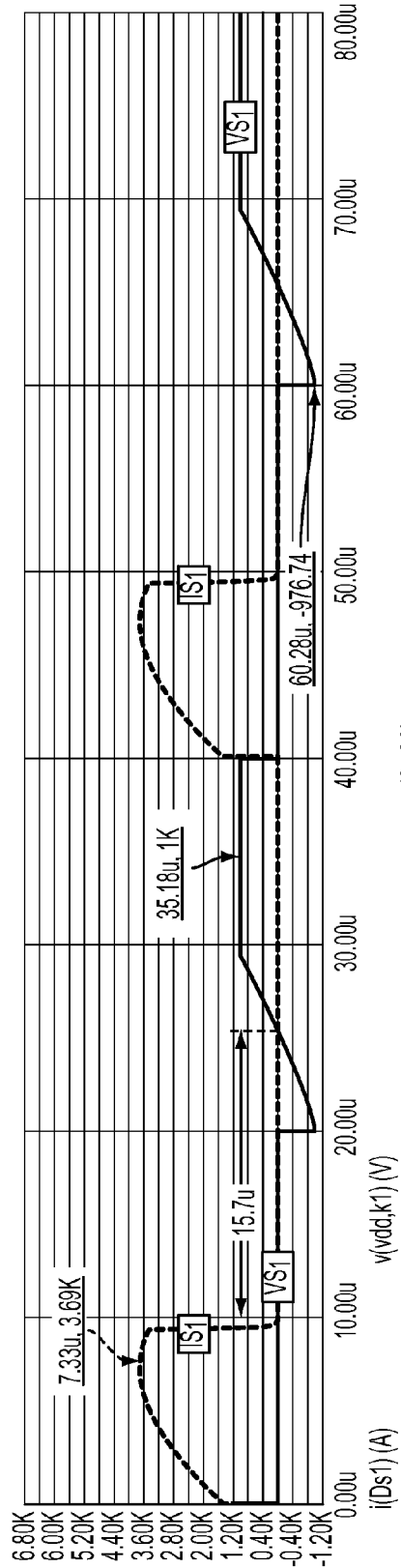

Referring back to FIG. 4A, both resonant capacitors 114a-114b are quickly charged to the source voltage via their respective voltage input rails 104a-104b during the short-circuit fault condition (see FIG. 5B). When the forward voltage across clamping diodes 118a-118b exceeds the input source voltage, the clamping diodes 118a-118b become forward biased (i.e., switched on) such that the current begins flowing through the input source (e.g., the positive voltage rail 104a/negative voltage rail 104b) and input capacitor 105 in a reverse direction. Further, the forward biased clamping diodes 118a-118b also reverse the voltage (e.g., VS1) across the respective thyristors, i.e., the positive-side thyristors 112a-112d and the negative-side thyristors 116a-116d (see FIG. 5C). Accordingly, the current flowing through the thyristors 112a-112d/116a-116d is reduced below the minimum current threshold (i.e., below the holding current threshold) and the thyristors 112a-112d/116a-116d are switched off. Notably, the waveforms of FIG. 5A refer to a "bolted" short circuit such that the impedance realized by the load becomes as low as approximately 10 microohms (μΩ) to approximately 1 milliohm (mΩ), for example. As a result, the voltage across the load (e.g., Vload) is also reduced to approximately 0 V (see FIG. 5A).

In a short-circuit fault condition or an overload condition, the clamping diodes 118a-118b provide intrinsic current and power limits independent of the overload protection provided by the resonant capacitor cells 102a-102b. Regardless of the operating mode (normal load or fault condition), each thyristor 112a-112d/116a/116d operates at one half of the load switching frequency providing a longer recovery time. For example, when thyristor 112b turns on, the voltage across thyristor 112a becomes negative and is gradually increased with a mild rate or rise following the sinusoidal waveform of the resonant tank voltage.

Figure 5D:
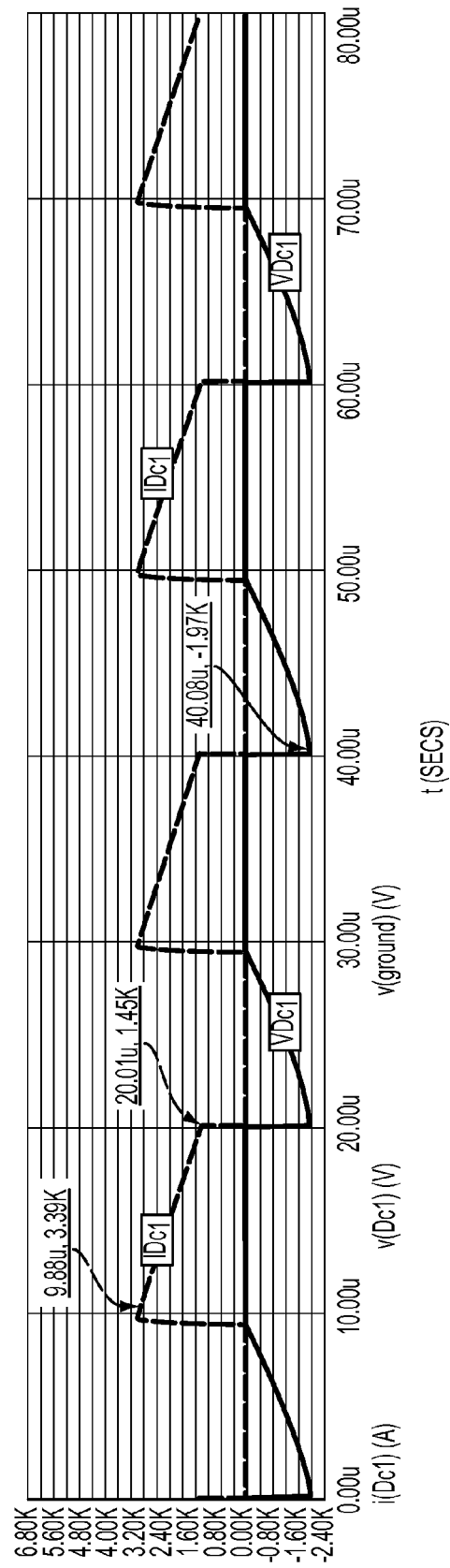

When a gate signal is applied to the gate of the thyristors, the thyristors 112a-112d/116a-116d are again switched on and the voltage (e.g., VDc1) across both clamping diodes 118a-118b is reversed such that the respective current (e.g., IDc1) is extinguished (see FIG. 5D). The continuous switching of the positive-side thyristors 112a-112d and the negative-side thyristors 116a-116d generates short current segments/pulses (e.g., IS1/IS2-IS3/IS4) which maintain regularly interrupted power flow through the ZCS circuit breaker 100 as opposed to randomly interrupting current in conventional circuit breakers. In this manner, stresses and faults caused by forced commutation are prevented.

Figure 6:
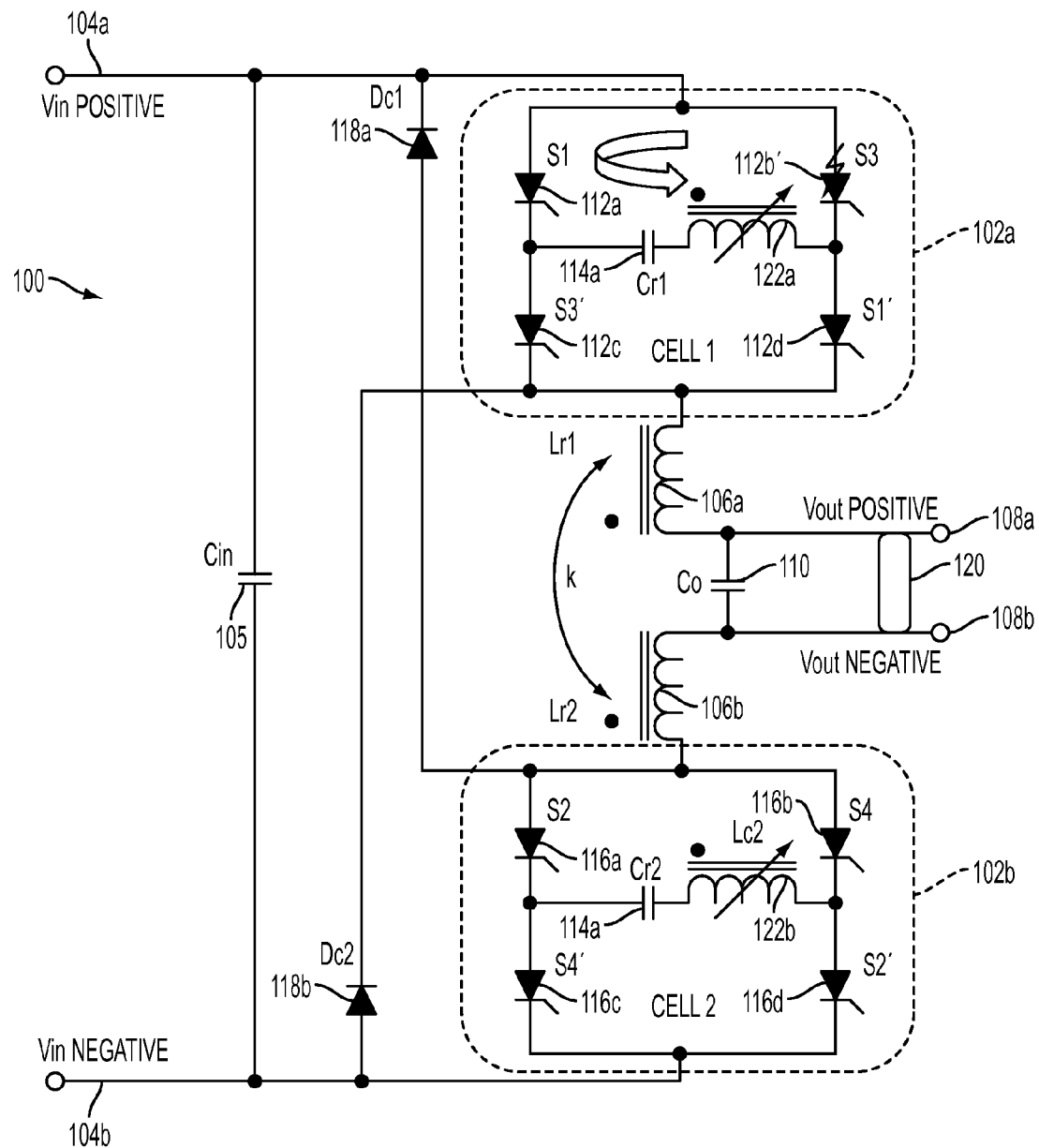
FIG. 6 illustrates an electrical schematic of a solid-state circuit breaker including a controllable inductor configured to limit the current during a short-circuit condition according to a non-limiting embodiment.

Turning now to FIG. 6, an electrical schematic of a ZCS circuit breaker 100 is illustrated according to another non-limiting embodiment. The ZCS circuit breaker 100 operates in a manner similar to that described in detail above. The ZCS circuit breaker 100 of FIG. 6, however, includes a variable fault containment element 122 configured to limit current flow through a resonant capacitor cell 102a/102b during a short-circuit condition caused by one or more faulty thyristors 112b'. In this manner, fault propagation through the ZCS circuit breaker 100 can be prevented.

More specifically, one or more of the resonant capacitor cells 102a/102b includes a variable fault containment element 122 interposed in series with the current path between a pair of thyristors (e.g., the first positive-side thyristor 112a and the second positive-side thyristor 112b). The variable fault containment element may comprise, for example, a controllable inductor 122. The controllable inductor 122 is configured to operate in a passive mode and an inductance mode in response to receiving an electronic control signal generated by a microcontroller. The passive mode generates virtually no inductance, or negligible inductance (e.g., 10% of the full inductance) while the inductance mode generates the full inductance provided by the controllable inductor 122. A more detailed operation of the controllable inductor is described in U.S. Pat. No. 8,773,231, which is incorporated herein by reference in its entirety.

According to a non-limiting embodiment, the first resonant capacitor cell 102a includes a first a controllable inductor 122a and the second resonant capacitor cell 102b includes a second controllable inductor 122b. The first controllable inductor 122a has a first end connected to the first resonant capacitor 114a, and a second end connected to the second positive-side thyristor and the fourth positive-side thyristor 112d. The second controllable inductor 122b has a first end connected to the second resonant capacitor 114a, and a second end connected to the second negative-side thyristor 116b and the fourth negative-side thyristor 116d. Should one of the positive-side thyristors 112a-112d and/or one of the negative-side thyristors 116a-116d experience a fault (e.g., faulty thyristor 112b') causing a short-circuit current path therethrough, the inductance of a corresponding controllable inductor (e.g., first controllable inductor 122a) can be dynamically adjusted to limit the current through the short-circuit current path of the faulty thyristor (e.g., thyristor 112b') as discussed in greater detail below.

Figure 7:
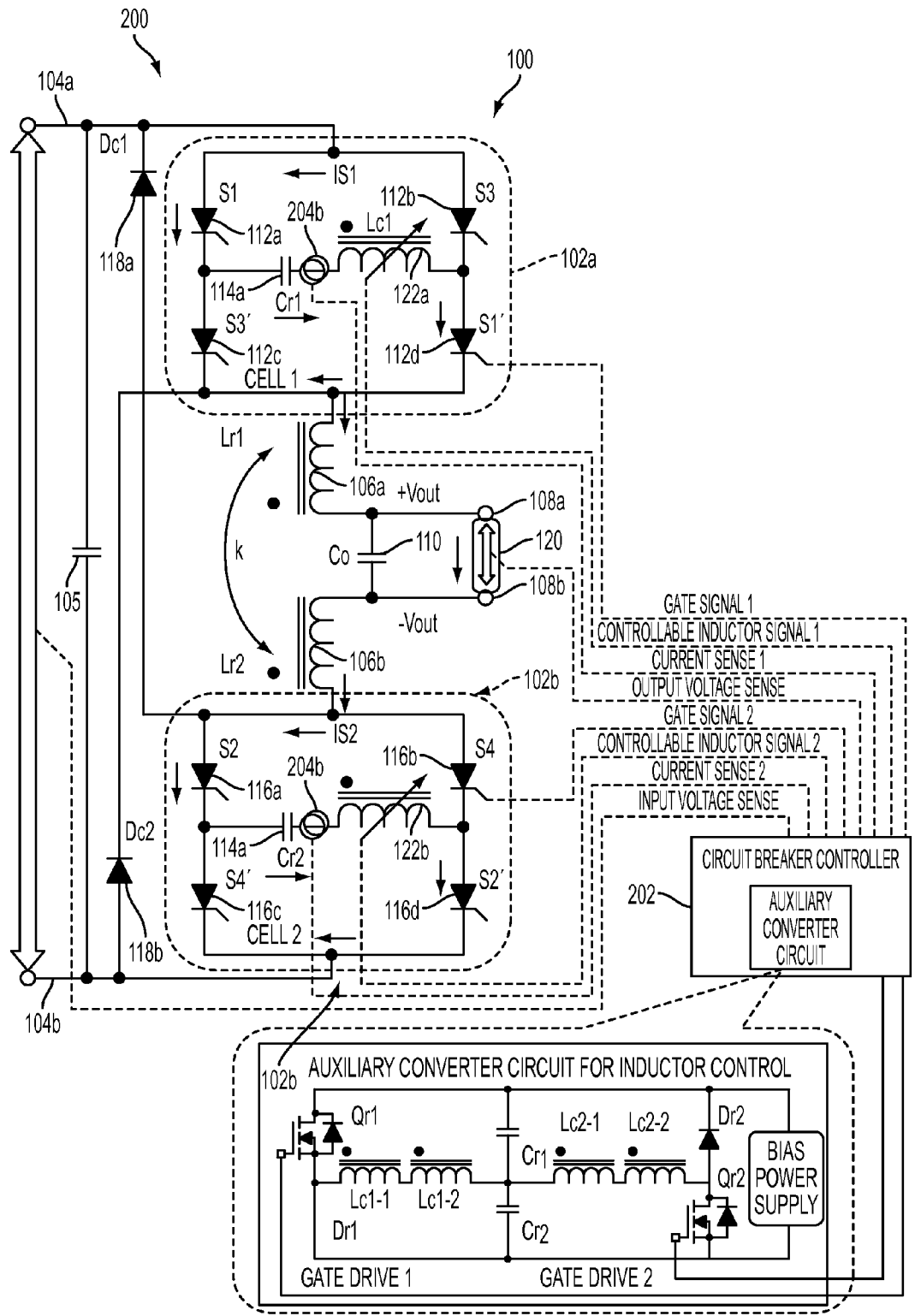
FIG. 7 illustrates an electrical schematic of the solid-state circuit breaker having a controllable inductor and an electronic circuit breaker control module according to a non-limiting embodiment.

Turning to FIG. 7, solid-state circuit protection system 200 is illustrated according to a non-limiting embodiment. The solid-state circuit protection system 200 includes a ZCS circuit breaker 100 in signal communication with an electronic circuit breaker control module 202. The circuit breaker 100 includes a first and second controllable inductors 122a-122b and operates as described in detail above. It should be appreciated that the circuit breaker control module 202 includes memory and a microprocessor. The memory is configured to store one or more computer readable instructions and/or threshold values. The microprocessor is configured to execute one or more computer readable instructions stored in the memory and to generate one or more electrical signals based on one or more monitored conditions of the ZCS circuit breaker 100. The monitored conditions may include, but are not limited to, the current through the thyristors 112a-112d/1116a-116d, input voltage supplied by the positive/negative rails 104a/104b, the output voltage realized by the load 120, and the current flowing through the first and second controllable inductors 122a/122b.

Based on the monitored conditions and threshold voltages, the circuit breaker control module 202 (i.e., the microcontroller) is configured to output one or more control signals for controlling various components of the ZCS circuit breaker 100 including, but not limited to, the positive-side thyristors 112a-112d, the negative side thyristors 116a-116d, the first controllable inductor 122a, and the second controllable inductor 122b. A more detailed operation of the circuit breaker control module 202 is described in U.S. Pat. No. 8,076,967, entitled, "Integrated Smart Power Switch" which is incorporated herein by reference in its entirety. In at least one non-limiting embodiment, the circuit breaker control module 202 determines whether a short-circuit fault condition or an over-voltage condition exists based on various operating parameters including, but not limited to, the input voltage (Vin) of the ZCS circuit breaker 100, the current flowing through the first resonant capacitor cell 102a and/or the second resonant capacitor cell 102b. When a short-circuit fault condition or an over-voltage condition exists, the circuit breaker control module 202 terminates the gate signals applied to the respective positive-side thyristors 112a-112d and/or respective negative-side thyristors 116a-116d. As a result, the current through a respective group of four thyristors is inhibited such that the drive current through a respective resonant capacitor cell 102a/102b is inhibited. In this manner, a respective resonant capacitor cell 102a/102b is effectively switched off and the load 120 is disconnected.

Figure 8:
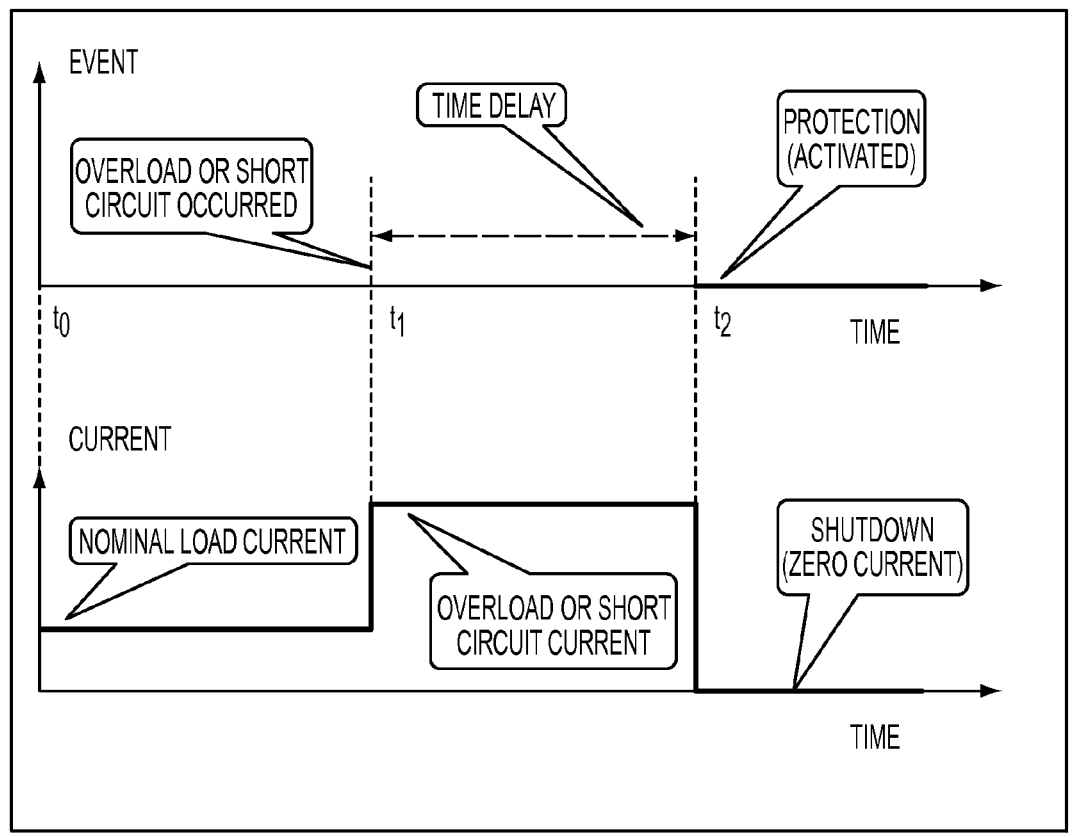
FIG. 8 illustrates a timing diagram illustrating the operation of an electronic circuit breaker control module configured to control the solid-state circuit breaker according to a non-limiting embodiment.

Referring to FIG. 8, a time diagram illustrates the operation of the circuit breaker control module 202 in response to detecting a short-circuit fault condition or overload condition. From time $t_0$ to $t_1$, the circuit breaker control module 202 operates under nominal load conditions. That is, the circuit breaker control module 202 operates while no short-circuit faults or overload faults exist. At time $t_1$ an overload condition, for example, occurs. However, a time delay exists from the time when the overload condition occurs to the time the circuit breaker control module 202 detects the overload condition and executes protection operations. The time delay may be caused by various conditions including, but not limited to, sensor detection delays, communication between the sensor outputs and the circuit breaker control module 202, circuit breaker control module 202 processing delays, and a fraction of the switching cycle (e.g., up to one half cycle of the resonant frequency). During this time delay, the ZCS circuit breaker 100 operates under overload conditions from time $t_1$-$t_2$ and provides intrinsic current limiting independent of the protection control operations provided by the circuit breaker control module 202.

Referring to time $t_2$, the circuit breaker control module 202 terminates the gate signals to the positive-side thyristors 112a-112d and/or the negative-side thyristors 116a-116d. Accordingly, the current through thyristors 112a-112d/116a-116d is inhibited such that the respective first resonant capacitor cell 102a and/or second resonant capacitor cell 102b are effectively switched off, thereby disconnecting the load 120. During the process of switching off the first resonant capacitor cell 102a and/or second resonant capacitor cell 102b, the thyristors 112a-112d/116a-116d will be allowed to complete conduction of one half cycle at resonant frequency during which the short-circuit fault condition or overload condition occurred. That is why when the gate signals are terminated by the circuit breaker control module 202, the thyristors 112a-112d/116a-116d maintain a natural, zero-current commutation that avoids applying transient stress to the thyristors 112a-112d/116a-116d.

According to a non-limiting embodiment, the circuit breaker control module 202 monitors the current through the first and second resonant capacitors 114a/114b at respective nodes 204a/204b, and includes an auxiliary converter circuit 203 that controls the first and second controllable inductors 122a/122b based on the resonant capacitor currents. Under normal conditions, the peak resonant capacitor current of the first resonant capacitor 114a is equal or substantially equal to the peak resonant capacitor current of the second resonant capacitor 114b. When, however, a short-circuit due to a faulty thyristor (e.g., thyristor 112b') exists, the peak resonant capacitor currents of the first and second resonant capacitors 114a/114b, respectively, are unequal.

Figure 9:
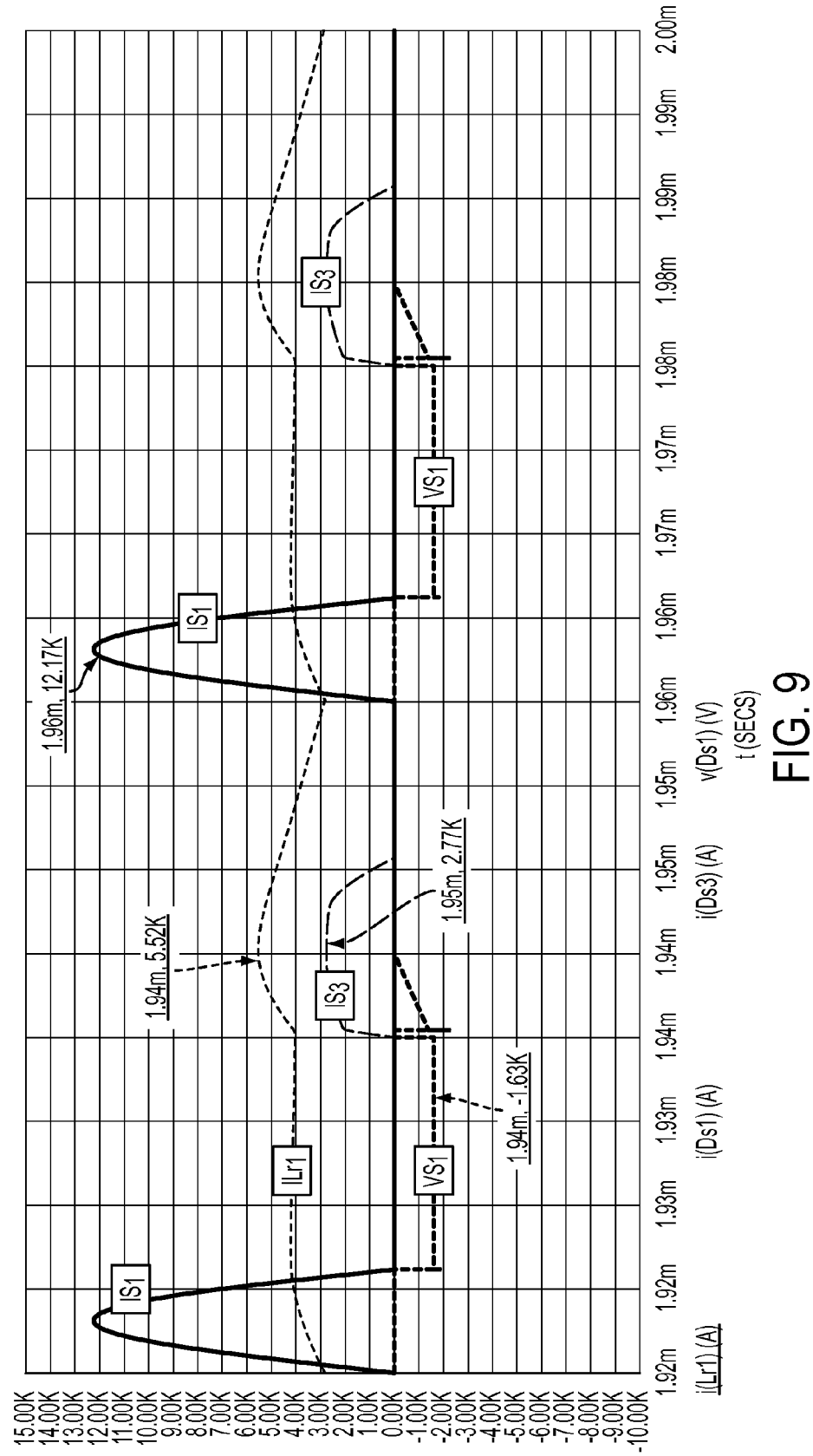
FIG. 9 is a diagram illustrating the electrical parameters of the solid-state circuit breaker including the controllable inductor during a short-circuit condition.

With this is mind, the circuit breaker control module 202 is configured to monitor a first peak voltage of the first resonant capacitor 114a and a second peak voltage of the second resonant capacitor 114b. When the first and second peak voltages are equal (or substantially equal), the circuit breaker control module 202 outputs a first control signal that induces the passive mode of the first and second controllable inductors. When, however, the first and second peak voltages are unequal, the circuit breaker control module 202 outputs a second control signal that induces the full inductance mode of the first controllable inductor and/or the second controllable inductor 122b. When the full inductance of the first inductor 122a and/or second controllable inductor 122b is generated, current flow (e.g., Is3) through the faulty thyristor (e.g., thyristor 112b') is limited (see FIG. 9). In this manner, the fault can be contained at the faulty thyristor (e.g., thyristor 112b') instead of damaging the entire resonant capacitor cell 102a/102b and propagating throughout the ZCS circuit breaker 100.

According to another embodiment, the circuit breaker control module 202 compares monitored peak resonant capacitor current values during each cycle to a threshold value stored in memory. When the monitored current value of the first resonant capacitor 114a and/or second resonant capacitor 114b does not exceed the threshold value, the circuit breaker control module 202 generates a control signal to initiate the passive mode of a respective controllable inductor 122a/122b as described in detail above. When, however, the monitored current value of the first resonant capacitor 114a and/or second resonant capacitor 114b exceeds the threshold value, the circuit breaker control module 202 determines a faulty thyristor exists (e.g., thyristor 112b') and generates a control signal to initiate the full inductance mode of a respective controllable inductor 122a/122b as described in detail above.

As described in detail above, various embodiments of the invention provide a solid-state zero current switching (ZCS) circuit breaker that includes thyristors to partially interrupt (i.e., limit) fault current flow while delivering current in short, defined segments which lower the voltage transient surges applied to the thyristors until the series resonant capacitor cell is effectively switched off. Further, the current pulses limit the current delivered through the system in a quick response fault clearing times (e.g., ranging from 10 microseconds (μs) to 50 μs) such that damage from current overload conditions can be prevented. According to another embodiment, the series resonant circuit includes a controllable inductor configured to operate in a passive mode (e.g., 10 percent of the available inductance) when the solid-state circuit breaker operates under normal operating conditions, and a full inductance mode (100 percent of available inductance) when a thyristor fault occurs causing short-circuit path therethrough. In this manner, the short circuit current can be limited, thereby preventing additional faults from propagating throughout the ZCS circuit breaker.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A solid-state zero current switching circuit breaker configured to interrupt current flow between a voltage input and a load, the solid-state zero current switching circuit breaker comprising:
   at least one resonant capacitor cell including an input configured to receive a source voltage and an output configured to deliver drive current to the load, the at least one resonant capacitor cell configured to selectively limit the drive current to the output based on a variable voltage; and
   at least one voltage clamping switch configured to detect a short-circuit fault or an overload condition and to adjust the variable voltage in response to detecting the short-circuit fault condition such that the at least one resonant capacitor cell limits the drive current.

2. The solid-state zero current switching circuit breaker of claim 1, wherein the at least one resonant capacitor cell includes at least one semiconductor device configured to deliver the drive current to the output when voltage across the at least one voltage clamping switch exceeds a voltage threshold and to limit the drive current when voltage across the at least one voltage clamping switch is below the voltage threshold.

3. The solid-state zero current switching circuit breaker of claim 2, wherein the at least one voltage clamping switch is a current-direction controllable semiconductor device configured to selectively operate in one of an activated mode or a deactivated mode based on the short-circuit fault condition.

4. The solid-state zero current switching circuit breaker of claim 3, wherein the activated mode maintains the voltage across the at least one semiconductor device below the voltage threshold such that the drive current is limited.

5. The solid-state zero current switching circuit breaker of claim 4, wherein the at least one voltage clamping switch determines the short-circuit condition exists when a voltage differential across the at least one voltage clamping switch exceeds a fault voltage threshold, and determines the short-circuit condition does not exist when the voltage differential is at or below the fault voltage threshold.

6. The solid-state zero current switching circuit breaker of claim 5, wherein the at least one semiconductor device includes a plurality of thyristors arranged as a bridge rectifier circuit, each of the thyristors including a gate terminal and at least one of the thyristors configured to inhibit the drive current in response to terminating a gate signal to the gate terminal.

7. The solid-state zero current switching circuit breaker of claim 6, wherein the bridge rectifier circuit comprises:
   a first positive-side thyristor having an anode connected to the input and a cathode connected to a first terminal of a resonance capacitor;
   a second positive-side thyristor having an anode connected to the input and a cathode connected to an opposite terminal of the resonance capacitor;
   a third positive-side thyristor having an anode connected to the first terminal of the resonance capacitor and a cathode connected to the output; and
   a fourth positive-side thyristor having an anode connected to the opposite terminal of the resonance capacitor and a cathode connected to the output.

8. The solid-state zero current switching circuit breaker of claim 7, wherein the bridge rectifier circuit further includes controllable inductor connected between the resonance capacitor and the second positive-side thyristor, the controllable inductor selectively operable in a passive mode and a full inductance mode to limit a level of current through the second positive-side thyristor based on capacitor current level flowing through the resonance capacitor.

9. The solid-state zero current switching circuit breaker of claim 8, wherein the controllable inductor initiates the passive mode and the full inductance mode in response to an electronic control signal, the passive mode generating a first inductance and the full inductance mode generating a second inductance that is greater than the first inductance.

10. A solid-state circuit protection system, comprising:
   a first resonant capacitor cell having a positive-side input connected to a positive voltage source and a positive-side output connected to a positive-side output terminal, the first resonant capacitor cell including plurality of positive-side semiconductor devices configured to deliver a first drive current to the positive-side output, and at least one positive-side controllable inductor configured to selectively limit a level of the first drive current flowing through at least one of the positive-side semiconductor devices;
   a second resonant capacitor cell having an negative-side input connected to a negative voltage source and a negative-side output connected to a negative-side output terminal, the second resonant capacitor cell including plurality of negative-side semiconductor devices configured to deliver a second drive current to the negative-side output, and at least one negative-side controllable inductor configured to selectively limit a level of the second drive current flowing through at least one of the negative-side semiconductor devices; and
   an electronic circuit breaker control module in signal communication with the positive-side resonant capacitor cell and the negative-side resonant capacitor cell, the circuit breaker control module configured to monitor a current level of at least one of the first and second drive currents, and to initiate at least one of the positive-side and negative-side controllable inductors from a passive mode into a full inductance mode in response to a current level of the first and second drive current, respectively, exceeding a current level threshold.

11. The solid-state circuit protection system of claim 10, wherein the first resonant capacitor cell and the second resonant capacitor cell are each configured to selectively limit the first and second drive currents to the first and second outputs, respectively, based on first and second variable voltages, respectively.

12. The solid-state circuit protection system of claim 11, further comprising:
   a first voltage clamping switch that is activated in response to a short-circuit fault or an overload condition and is configured to vary the first variable voltage applied to the first resonant capacitor cell when activated such that the first resonant capacitor cell limits the first drive current to the positive-side output; and
   a second voltage clamping switch that is activated in response to the short-circuit fault or an overload condition and is configured to vary the second variable voltage applied to the second resonant capacitor cell when activated such that the second resonant capacitor cell limits the second drive current to the negative-side output.

13. The solid-state circuit protection system of claim 12, wherein the circuit breaker control module generates a control signal that continuously switches on and off at least one positive-side semiconductor device to limit the first drive current in response to varying the first variable voltage via the activated first voltage clamping switch, and wherein at least one negative-side semiconductor device is continuously switched on and off to limit the second drive current to the negative-side output in response to varying the second variable voltage via the activated second voltage clamping switch.

14. The solid-state circuit protection system of claim 13, wherein the plurality of positive-side semiconductor devices and the plurality of negative-side semiconductor devices comprise of thyristors having a gate terminal, at least one thyristor configured to inhibit the drive current in response to terminating a gate signal to the gate terminal, and wherein the first and second voltage clamping switches comprise of diodes.

15. A method of interrupting current flow between a voltage input and a load, the method comprising:
- delivering a source voltage to an input of at least one resonant capacitor cell and delivering drive current from the source voltage to a load connected to an output of the at least on resonant capacitor cell;
- detecting a short-circuit fault condition or an overload condition between the source voltage and the load, and adjusting a variable voltage applied to the at least one resonant capacitor cell in response to detecting the short-circuit fault condition or the overload condition; and
- limiting the drive current flowing through the at least one resonant capacitor cell in response to adjusting the variable voltage.

16. The method of claim 15, wherein the limiting the drive current includes continuously switching on and off at least one semiconductor device included in the at least one resonant capacitor cell to limit the drive current in response to adjusting the variable voltage.

17. The method of claim 16, further comprising maintaining the at least one semiconductor device switched on to deliver uninhibited current to the load when the short-circuit fault or an overload condition is not detected.

18. The method of claim 17, further comprising detecting the short-circuit fault or an overload condition in response to determining a voltage differential across at least one voltage clamping switch exceeds a fault voltage threshold, and determining the short-circuit condition does not exist when the voltage differential is at or below the fault voltage threshold.

19. The method of claim 18, further comprising selectively switching on the at least one voltage clamping switch in response to the short-circuit fault or an overload condition and adjusting the variable voltage in response to switching on at least one voltage clamping switch.

20. The method of claim 19, further comprising dynamically increasing an inductance in the at least one resonant capacitor cell in response to detecting that at least one semiconductor device is faulty such that a level of the drive current flowing through the faulty semiconductor device is reduced.

* * * * *